United States Patent [19]

Ishimaru et al.

[11] Patent Number: 4,607,491
[45] Date of Patent: Aug. 26, 1986

[54] COOLING TRAP FOR VACUUM

[76] Inventors: Hajime Ishimaru, 128-102, Namiki 2-chome, Sasage 1352, Sakura-mura, Niihari-gun, Ibaraki-ken; Masao Miyamoto; Shojiro Komaki, both of 31-1, Kameido 6-chome, Koto-ku, Tokyo, all of Japan

[21] Appl. No.: 694,412

[22] Filed: Jan. 24, 1985

[30] Foreign Application Priority Data

Jan. 27, 1984 [JP] Japan ................................ 59-13999

[51] Int. Cl.[4] ............................................ B01D 8/00
[52] U.S. Cl. ........................ 62/55.5; 62/100; 62/268; 55/269; 165/46; 417/901
[58] Field of Search ..................... 62/55.5, 100, 268; 165/46; 417/901; 55/269

[56] References Cited

U.S. PATENT DOCUMENTS

| 3,127,530 | 3/1964 | White | 165/46 |
| 3,396,548 | 8/1968 | Mahe | 62/55.5 |
| 3,585,807 | 6/1971 | Hengevoss | 62/55.5 |

FOREIGN PATENT DOCUMENTS 38532 8/1973 Australia ........................... 165/46

Primary Examiner—Ronald C. Capossela
Attorney, Agent, or Firm—Robert E. Burns; Emmanuel J. Lobato; Bruce L. Adams

[57] ABSTRACT

A vacuum cooling trap for use in a vacuum chamber comprising: a laminated structure comprised of a pair of plates bonded together in face-to-face contacting relation, the plates being composed of metal of high thermal conductivity, and the plates having aligned confronting conduit portions which jointly define a conduit within the laminated structure for circulating a cooling medium through the laminated structure during use of the vacuum cooling trap.

20 Claims, 10 Drawing Figures

COOLING TRAP FOR VACUUM

BACKGROUND OF THE INVENTION

The present invention relates to a very high vacuum cooling trap. Accompanying the progress in the technique for establishing very high vacuums, cooling traps have been widely used. Examples include a liquid nitrogen shroud for an MBE apparatus, and cooling traps for vacuums such as a trap for sublimation, a trap for oil diffusion pumps, and the like. Many instruments for measuring high vacuum have also been equipped with a shroud. Further, cryopumps which use liquid helium also utilize the trap effect, as a matter of course.

Shroud traps are generally made of stainless steel. Some traps such as those for cryopumps have been equipped with cooling fins. In most of them, however, a cooling medium such as liquid nitrogen is stored in a stainless steel vessel, and the stainless steel vessel is cooled by the cooling medium so that gaseous molecules are adsorbed. With such vacuum cooling traps employing stainless steel, however, strong and heavy support rods must be used to support the traps, resulting in increased heat conductivity, and consuming the cooling medium in large amounts.

The amount of liquid nitrogen which is consumed in the initial filling is determined by [weight of trap]×[latent heat]. Here, SUS:Aluminum=2:1; hence, aluminum is advantageous. SUS designates stainless steel.

Because of the fitting type, the portions filled with the cooling medium exhibit the cooling trap effect, but the unfilled portions do not exhibit that effect. Therefore, it is necessary to supply the cooling medium while monitoring the liquid level at all times. Since the cooling traps are produced by welding, fine cracks exist in the welded portions. Therefore, water which has infiltrated through the cracks, freezes, thereby further cracking the welded portions and causing leaks. When holes are formed in the cooling trap or when a cooling trap structure is complex, the welding structure is also very complex. Further, a cooling trap of the fitting type is constructed as a unified structure by welding. Accordingly, such a cooling trap cannot cope with thermal expansion or contraction.

SUMMARY OF THE INVENTION

In view of the above-mentioned defects, the object of the present invention is to provide a cooling trap which can be formed in any shape, which is lightweight, which is manufactured at a reduced cost, and which consumes the cooling medium in small amounts.

DESCRIPTION OF THE PREFERRED EMBODIMENT

The invention will be described below in detail in conjunction with the drawings.

Figure 1:
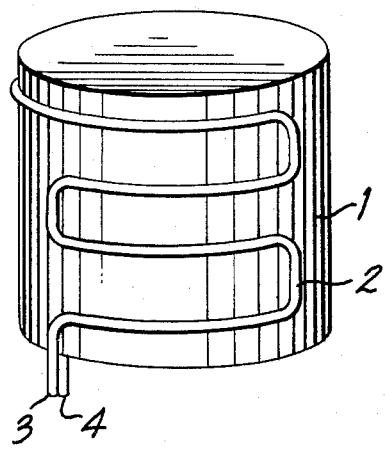
FIG. 1 is a schematic view showing the structure of a cooling trap according to the present invention.

FIG. 1 is a diagram showing the fundamental structure of a vacuum cooling trap according to the present invention. A pipe 2 for conducting a flowing cooling medium is arranged maintaining a suitable distance on a substrate 1 such as of an aluminum plate having good heat conductivity. The cooling medium, such as liquid nitrogen is introduced through an inlet port 3 of the pipe 2 and is discharged from an outlet port 4 of the pipe. The vacuum cooling trap, which consists of the substrate 1 on which the pipe 2 is arranged, can be installed in a vacuum vessel. The pipe inlet port 3 and outlet port 4 can be provided on the outside of the vacuum vessel, as a matter of course. In this cooling trap, a small pipe is suitably arranged on a plate-like substrate which is formed in an appropriate shape. Then, an end of the pipe is closed, one pressure is applied through the other end of the pipe to increase the inner diameter of the pipe, so that the cooling medium can be introduced in large amounts. Further, by employing a pipe of a small diameter, it is easy to shape the cooling trap and arrange the pipe.

It is also possible to produce a pipe through which the cooling medium flows by using aluminum plates as substrates for use in obtaining a very high vacuum.

For this purpose, a conduit pattern is formed in a pair of aluminum plates and then the two plates are bonded together face to face with the conduit patterns aligned, so as to form a laminated structure containing therein the conduit. Preferably the plate-like substrates are formed by bonding with pressure the substrates having said conduit pattern, closing one end of the conduit pattern after the substrates have been bonded together, and applying pressure through the other end of the conduit pattern. The inner diameter of the pipe and the thickness of pipe can be suitably selected by selecting the substrate and by adjusting the pressure at the time of bonding the substrates. The thus constructed cooling trap can be used for a very high vacuum, the surfaces thereof having been subjected to a special processing and a special machining.

Figure 2:
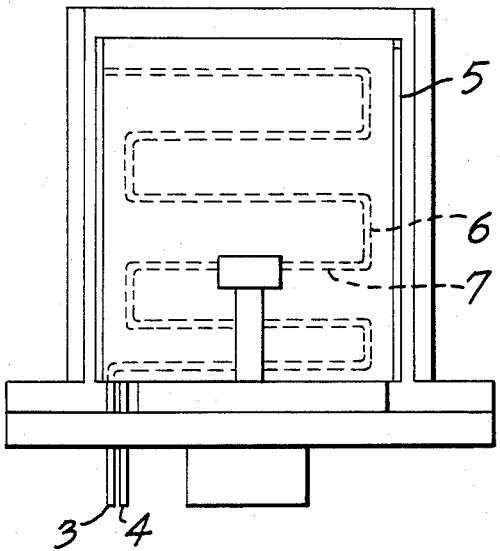
FIG. 2 is a section view showing a portion of a titanium sublimation pump employing the cooling trap of the present invention.

FIG. 2 shows an example in which the cooling trap of this invention is used for a titanium sublimation pump. There are arranged a vaporizing source 7 to vaporize metal titanium, and a cooling plate 5 and pipe 6 similar to the cooling trap shown in FIG. 1, that consititute a cooling trap to absorb the vapor. The pipe 6 has an inlet port and an outlet port that are formed in one stroke like those of FIG. 1. If two pipes are arranged in parallel, the temperature gradient can be cancelled, and the temperature becomes equal at the inlet port and the outlet port. It is possible to arrange two pipes in parallel to carry the flowing cooling medium in two separate systems.

The cooling trap of the invention can be obtained by a method according to which the pipe is arranged on the substrate and the diameter of the pipe is enlarged, or by a method according to which patterns are formed in the two substrates followed by machining.

Ideally, from the standpoint of heat conductivity and machining, the substrate and the pipe should be made of the same material. However, they may be made of dissimilar metals if they both have good thermal conductivity.

Figure 4:
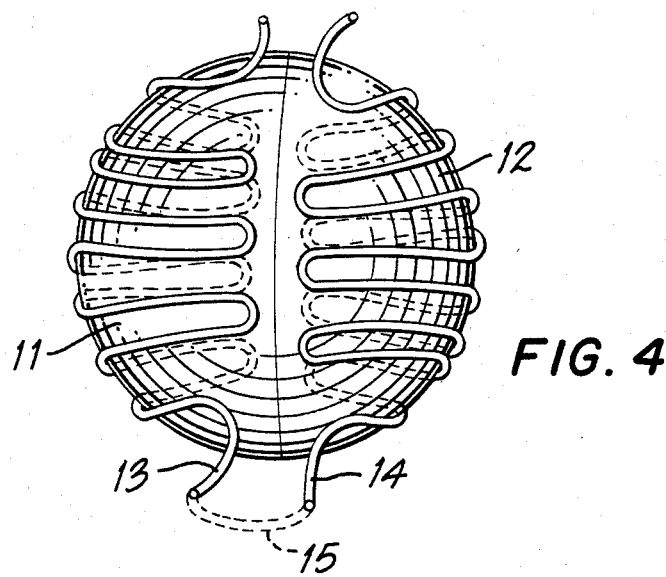
FIGS. 3 and 4 are schematic views of a cylindrical cooling trap and of a spherical cooling trap.
Figure 3:
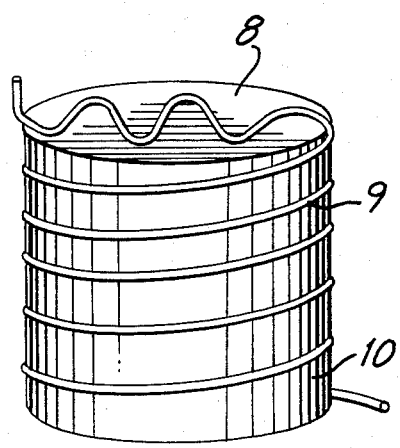

FIGS. 3 and 4 illustrate cooling traps according to other embodiments of the present invention, i.e., illustrate a cylindrical cooling trap and a spherical cooling trap. In the cylindrical cooling trap, the pipe 9 is arranged not only on the cylindrical portion 10 but also on a cover or end portion 8.

In the spherical cooling trap of FIG. 4, a pipe 13 is arranged on a left semi-spherical portion 11, and a pipe 14 is arranged on a right semi-spherical portion 12, and the pipes 13, 14 are connected together via a connection pipe 15.

Figure 5:
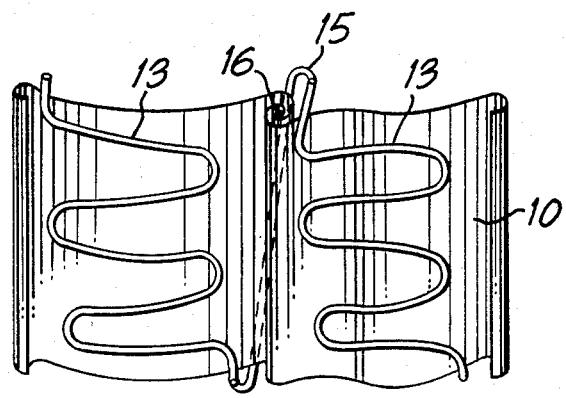
FIG. 5 is a schematic view of a cooling trap of the split type.
Figure 6A:
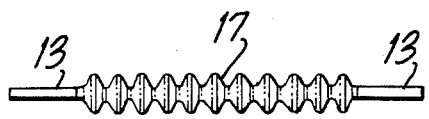
FIGS. 6A and 6B are schematic views of connecting pipes.
Figure 6B:
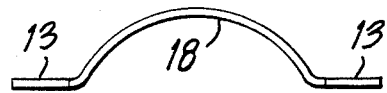

FIG. 5 shows an embodiment of a part of a cooling trap of the present invention. A material having good heat conductivity, such as an aluminum alloy which exhibits large thermal expansion and contraction, is used for the cooling trap. When a large cooling trap is constructed as a unified structure, deformation develops due to thermal expansion and contraction, causing some parts to come into contact with other parts. To avoid such a problem, the cooling trap is divided into separate pieces of a suitable size as shown in FIG. 5, and the individual pieces are fitted to each other as represented by a coupling portion 16 of cooling plate. With this structure, the couplings of the pieces can be divided without seriously sacrificing heat conductivity. The pipe 13 provided on the substrate 10 is connected to the pipes of other pieces via connection pipes 15. The connection can be best accomplished by welding for a vacuum. The connection pipe 15 may be a bellows connection pipe 17 as shown in FIG. 6A or a curved or bent connection pipe 8 as shown in FIG. 6B. These connection pipes absorb expansion or contraction caused by the heat.

Figure 7:
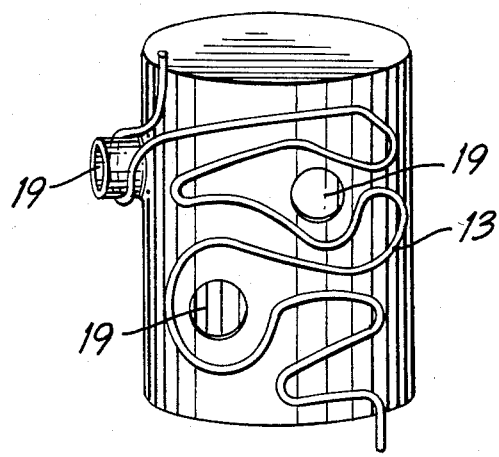
FIG. 7 is a schematic view of a cooling trap having holes.

FIG. 7 shows an embodiment of a cooling trap having holes. The pipe 13 is arranged around the holes 19 that are arbitrarily formed. The number and shape of the holes formed in the cooling trap are little affected by the method of production. Therefore, the pipe can be simply arranged to produce a cooling trap.

Figure 8:
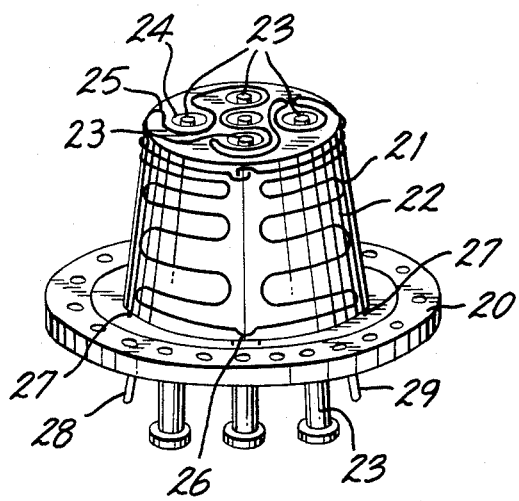
FIG. 8 is a schematic view of vaporizing sources employed in an MBE apparatus.

FIG. 8 shows a shroud type cooling trap in which the cooling trap surrounds the vaporizing source of an MBE (Molecular Beam Epitaxy) apparatus according to an embodiment of the present invention. On a flange 20 of the shroud is mounted a cooling trap 22 of the split type of the invention in a manner to surround a set of vaporizing sources 23 such as K cells. A K cell designates a Knudsen cell. In the cooling trap are formed holes 24 so that molecular streams from the vaporizing sources 23 can be taken out, and a pipe 25 is suitably arranged to divert the molecule streams. Pipes 21 to conduct the cooling medium of each of the portions are connected together by connection pipes 26. The individual pieces of the cooling trap are mounted on the flange by metal mounting fittings 27. The cooling medium is introduced and discharged through an inlet pipe 28 and an outlet pipe 29, respectively. Like the metallic mounting fittings 27, the inlet pipe and the outlet pipe may be made of a material having relatively poor heat conductivity. Generally, stainless steel may be used. The inlet port and outlet port may be coupled using Al-SUS-Al. Further, bellows may be formed using SUS to lengthen the heat conducting path, so that less heat flows in.

The conventional vacuum cooling trap employing liquid nitrogen is not in the form of a plate but is in the form of a hollow cylinder and is equipped with a reservoir for storing a cooling medium such as liquid nitrogen. This is because material having relatively low thermal conductivity, such as stainless steel, has generally been used. With such a cooling trap, the effect of the cooling trap is exhibited by the portions where the cooling medium is contained in the reservoir, but is not exhibited by the portions where the cooling medium is not contained. Furthermore, since the thickness must be increased, the chamber tends to become bulky. Using an aluminum member having good heat conductivity, however, the effect of the cooling trap is exhibited over considerably wide areas even if the cooling medium is contained only in a portion.

With regard to the production method, the conduit pattern is formed, pieces are molded individually, the pieces are pressurized in a mold and are then coupled, thereby to simply construct a cooling trap of any complex shape at relatively low cost. In the case of a cooling trap made of an aluminum alloy, two separate conduit systems can be arranged in parallel with each other. Hot water is supplied into one of the conduits to remove gas quickly. In the case of an aluminum alloy, the heating temperature for removing gas is from 120° to 150° C.

Figure 9:
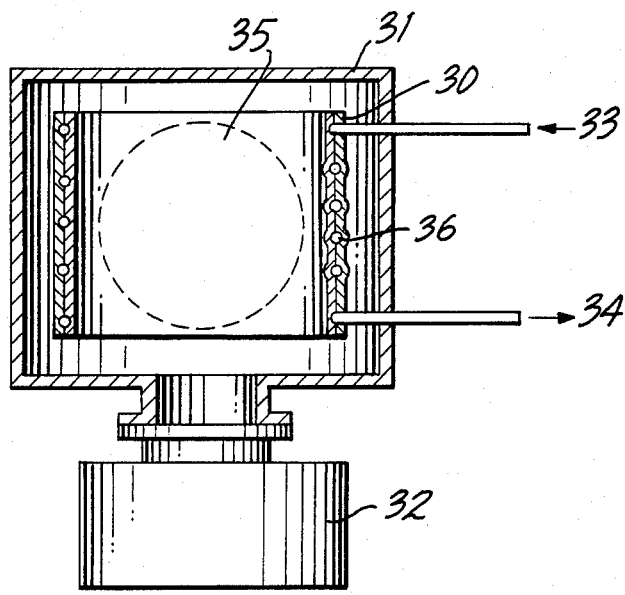
FIG. 9 shows a vacuum vessel incorporating vacuum cooling trap according to the present invention.

FIG. 9 shows a vacuum system incorporating a vacuum cooling trap according to the present invention. The vacuum cooling trap 30 is provided in a vacuum chamber 31. The vacuum chamber 31 is connected to a vacuum pump 32. Gas in the vacuum chamber 31 is exhausted by the vacuum pump 32. The vacuum cooling trap 30 is formed in cylindrical form. A serpentine conduit or pipe 36 is formed in the vacuum cooling trap 30. The cooling medium flows in the pipe 36 from the inlet 33 to the outlet 34. The inlet 33 and outlet 34 are lead to the outside of the vacuum chamber 31. The flowing cooling medium cools the vacuum cooling trap 30 which traps the gas in the vacuum chamber 31 so as to keep the vacuum chamber 31 at an extremely high vacuum, for example, $10^{-12}$ Torr. The inside portion of the cylindrical vacuum cooling trap 30 defines the effective working space 35 which is wider than the conventional one.

According to the present invention as described above, there is provided a very high vacuum cooling trap (shroud) which enables the shape to be arbitrarily changed, which is light, which can be constructed at a reduced cost, and which enables the effect of the cooling trap to be changed.

What is claimed is:

1. A vacuum cooling trap for use in a vacuum chamber comprising: a laminated structure comprised of a pair of plates bonded together in face-to-face contacting relation, the plates being composed of metal of high thermal conductivity, and the plates having aligned confronting conduit portions which jointly define a conduit within the laminated structure for circulating a cooling medium through the laminated structure during use of the vacuum cooling trap.

2. A vacuum cooling trap according to claim 1; wherein the laminated structure comprises a pair of press-bonded plates.

3. A vacuum cooling trap according to claim 2; wherein the pair of press-bonded plates comprises a pair of pressure-welded plates.

4. A vacuum cooling trap according to claim 3; wherein the laminated structure has a set of through-holes extending therethrough at locations where the two plates are in face-to-face contact.

5. A vacuum cooling trap according to claim 3; wherein the laminated structure has an annular configuration.

6. A vacuum cooling trap according to claim 3; wherein the conduit portions of the plates jointly define a plurality of separate continuous conduits.

7. A vacuum cooling trap according to claim 3; wherein the two plates are composed of aluminum.

8. A vacuum cooling trap according to claim 3; wherein the conduit portions of the plates have a serpentine extent to define a serpentine conduit.

9. A vacuum cooling trap according to claim 3; wherein the conduit portions of the plates comprise press-formed flow channels.

10. A vacuum cooling trap according to claim 1; wherein the laminated structure has a set of through-holes extending therethrough at locations where the two plates are in face-to-face contact.

11. A vacuum cooling trap according to claim 1; wherein the laminated structure has an annular configuration.

12. A vacuum cooling trap according to claim 1; wherein the conduit portions of the plates jointly define a plurality of separate continuous conduits.

13. A vacuum cooling trap according to claim 1; wherein the two plates are composed of aluminum.

14. A vacuum cooling trap according to claim 1; wherein the conduit portions of the plates have a serpentine extent to define a serpentine conduit.

15. In combination: a vacuum chamber; a vacuum pump connected to the vacuum chamber to exhaust gas therefrom and create a vacuum therein; and a vacuum cooling trap disposed within the vacuum chamber, the vacuum cooling trap comprising a laminated structure comprised of a pair of plates bonded together in face-to-face contacting relation, the plates being composed of metal of high thermal conductivity, and the plates having aligned confronting conduit portions which jointly define a conduit within the laminated structure for circulating a cooling medium through the laminated structure.

16. A combination according to claim 15; wherein the laminated structure comprises a pair of press-bonded plates.

17. A vacuum cooling trap according to claim 15; wherein the laminated structure has a set of through-holes extending therethrough at locations where the two plates are in face-to-face contact.

18. A vacuum cooling trap according to claim 15; wherein the two plates are composed of aluminum.

19. A vacuum cooling trap according to claim 15; wherein the conduit portions of the plates have a serpentine extent to define a serpentine conduit.

20. A vacuum cooling trap according to claim 15; wherein the conduit portions of the plates comprise press-formed flow channels.

* * * * *